United States Patent
Moore (10) Patent No.: US 8,575,871 B1
(45) Date of Patent: Nov. 5, 2013

(54) MODULAR COMPONENT ELECTRIC MACHINE

(76) Inventor: Christopher Moore, Prospect, KY (US)

(*) Notice: Subject to any disclaimer, the term of this patent is extended or adjusted under 35 U.S.C. 154(b) by 230 days.

(21) Appl. No.: 13/007,129

(22) Filed: Jan. 14, 2011

Related U.S. Application Data (63) Continuation of application No. 12/842,686, filed on Jul. 23, 2010.

(51) Int. Cl.
*H02P 25/08* (2006.01)

(52) U.S. Cl.
USPC ............... 318/254.1; 318/400.04; 310/49.42; 310/65 B; 310/201; 310/215.004

(58) Field of Classification Search
USPC ...... 310/68 B, 49.42, 216.086, 216.004, 181, 310/65 B, 201, 215.004; 318/254, 400.04, 318/254.1
See application file for complete search history.

(56) References Cited

U.S. PATENT DOCUMENTS

| | | | |
|---|---|---|---|
| 1,801,214 A | 4/1931 | Henke | |
| 3,163,810 A | 12/1964 | Schaefer | |
| 3,543,206 A | 11/1970 | King | |
| 3,991,354 A | 11/1976 | Rosa et al. | |
| 4,081,727 A | 3/1978 | Green | |
| 4,242,625 A | 12/1980 | Hedges | |
| 5,422,526 A | 6/1995 | Kawabata et al. | |
| 5,675,230 A | 10/1997 | Dunfield | |
| 6,005,321 A | 12/1999 | Bolton et al. | |
| 6,269,531 B1 | 8/2001 | Mercado et al. | |
| 6,278,354 B1 | 8/2001 | Booth | |
| 6,380,646 B1* | 4/2002 | Bernauer et al. | 310/49.42 |
| 6,445,272 B1 | 9/2002 | Mercado et al. | |
| 6,515,394 B2 | 2/2003 | Ueda et al. | |
| 6,774,757 B2 | 8/2004 | Fujiyoshi et al. | |
| 6,958,561 B2 | 10/2005 | Liao | |
| 7,071,807 B1 | 7/2006 | Herbert | |
| 7,119,467 B2* | 10/2006 | Dooley | 310/100 |
| 7,268,456 B2 | 9/2007 | Harada et al. | |
| 7,309,939 B2* | 12/2007 | Dooley | 310/201 |
| 7,321,176 B2* | 1/2008 | Strothmann | 310/156.15 |
| 7,436,098 B2* | 10/2008 | Dooley | 310/201 |
| 7,605,505 B2 | 10/2009 | Minke et al. | |
| 2002/0057031 A1 | 5/2002 | Ueda et al. | |
| 2003/0038557 A1* | 2/2003 | Strothmann | 310/181 |
| 2007/0273236 A1 | 11/2007 | Kaumann et al. | |
| 2008/0174212 A1* | 7/2008 | Rudel et al. | 310/68 B |

(Continued)

FOREIGN PATENT DOCUMENTS

| | | |
|---|---|---|
| CN | 2010098936 Y | 8/2008 |
| JP | 58066545 A | 4/1983 |

(Continued)

OTHER PUBLICATIONS

Deken, Ken, Vector Drive Basic, Rockwell Automation Reliance Electric, pp. 1-8, Cleveland, Ohio.

*Primary Examiner* — Paul Ip (74) *Attorney, Agent, or Firm* — Middleton Reutlinger; Alexander P. Brackett (57) ABSTRACT

The invention comprises a modular electric machine comprising a modular stator having a plurality of stator teeth and windings and a modular rotor comprising a plurality of modular magnetic elements for electromagnetic interaction with stator teeth. The invention further comprises a method of control of a modular electric machine.

17 Claims, 9 Drawing Sheets

(56) References Cited

U.S. PATENT DOCUMENTS

| | | |
|---|---|---|
| 2008/0220298 A1 | 9/2008 | Ishikawa et al. |
| 2008/0256783 A1* | 10/2008 | Alfermann et al. ............ 29/596 |
| 2008/0315706 A1* | 12/2008 | Dooley ........................ 310/201 |
| 2009/0152968 A1* | 6/2009 | Ishikawa et al. ................ 310/90 |
| 2009/0160391 A1 | 6/2009 | Flynn |
| 2009/0195109 A1* | 8/2009 | Horst .................... 310/216.004 |
| 2009/0230808 A1 | 9/2009 | Tatebe |
| 2010/0013346 A1* | 1/2010 | Peek ...................... 310/216.007 |
| 2010/0013438 A1 | 1/2010 | Anwar et al. |
| 2010/0013490 A1 | 1/2010 | Manabe et al. |
| 2010/0019603 A1* | 1/2010 | Saban ..................... 310/156.44 |
| 2010/0019613 A1* | 1/2010 | Saban et al. ........... 310/216.086 |
| 2010/0045219 A1* | 2/2010 | Ajima et al. ............. 318/400.04 |
| 2010/0119389 A1* | 5/2010 | Lazebnik et al. .......... 417/423.7 |
| 2010/0148622 A1 | 6/2010 | Dooley |

FOREIGN PATENT DOCUMENTS

| | | |
|---|---|---|
| JP | 4021501 A | 1/1992 |
| JP | 2002153001 A | 5/2002 |
| JP | 2002262498 A | 9/2002 |
| JP | 2002369428 A | 12/2002 |
| JP | 2003204647 A | 7/2003 |
| JP | 20042373 A | 8/2004 |
| JP | 2007336650 A | 12/2007 |
| JP | 2008228541 A | 9/2008 |
| JP | 2008295202 A | 12/2008 |

* cited by examiner

MODULAR COMPONENT ELECTRIC MACHINE

CROSS-REFERENCE TO RELATED APPLICATIONS

The present application is a continuation-in-part and claims the benefit of co-pending U.S. Utility application Ser. No. 12/842,686, filed Jul. 23, 2010, entitled "Modular Magnetic Circuit".

BACKGROUND OF THE INVENTION

1. Field of the Invention

The present invention relates generally to a high efficiency brushless direct current motor or generator and more specifically to an improved modular electric machine utilizing a modular stator construction, and modular rotor magnetic elements to produce an inexpensive, high power density motor. The invention further comprises a method of operation of an electric machine that results in a motor or generator capable of exceptional power density.

2. Description of the Related Art

Many designs and configurations of electric motors and generators are presently in use in the field of alternating current (AC) and direct current (DC) motors. Both AC and DC motors are in widespread use in many industries and are increasingly utilized in transportation applications where high-torque and low power consumption are two seemingly contradictory goals. The magnetic motor industry is continuously attempting to design motors with increased and enhanced efficiency to facilitate motor operation with a minimum of electric power consumption, thereby gaining competitive advantage. Motors utilizing an array of differing rotor and stator designs have been devised in an attempt to provide higher power densities throughout the motor rotor and stator, thereby leading to enhanced operational efficiency.

However, there is a need in the art for a motor or generator assembly employing a more efficient rotor and stator design to enhance electromagnetic flux density in the motor, particularly at the pole placements between rotor and stator elements. Traditionally, many motors utilize a single array of north-south-north magnets secured to a steel hub via an epoxy resin to form a magnetic rotor and/or stator. These prior art designs produce rotors that have one magnet pole per rotor or stator tooth that interacts electromagnetically with the complementary rotor or stator.

However, a design that permits multiple points of electromagnetic interaction between points on the rotor and stator of the motor would lead to enhanced efficiency and is therefore highly desirable. Furthermore, a motor design taking advantage of the superior magnetic properties of an efficient permanent magnet circuit to increase power density is also desirable.

Additionally, most prior art motors employ stator tooth windings that necessarily require additional machine weight, field losses, and axial length due to the arrangement of the end windings. Thus there is a need in the art for a motor that reduces the electromagnetic disadvantages as well as the manufacturing disadvantages of conventional DC motor designs.

Finally, many prior art electric machines that operate at relatively high electromagnetic flux densities suffer from overheating. The high field strength present at the rotor or stator hubs produces eddy currents and other undesirable electromagnetic interactions with surrounding components which in turn produces a great deal of heat. Thus there is a need for a lightweight rotor or stator hub in conjunction with a high-power density motor that rapidly and efficiently dissipates the excess heat generated by a high power density electric machine.

SUMMARY OF THE INVENTION

The present invention overcomes the disadvantages of the prior art by providing an electric machine, namely a motor or generator, having a modular construction that is lightweight, easily manufactured and assembled, and provides a very high power density, thereby enhancing motor efficiency.

The invention comprises a rotor constructed utilizing magnetic core elements having a plurality of legs around which current carrying windings are disposed, placed proximate a plurality of alternating pole and bucking magnets. The arrangement of pole and bucking magnets in conjunction with the core elements of the invention enhance electromagnetic flux density at the poles of the core elements, thereby providing for greater power throughout the motor.

Additionally, the modular construction of the magnetic core elements provides for a low-cost manufacturing and assembly of a motor according to the present invention. A plurality of core elements can be placed adjacent one another around a rotor hub or stator casing to produce a rotor or stator. Furthermore, this modular design permits the core elements to be assembled on a hub in a multiple rotor or stator configurations.

The instant invention further comprises a modular stator assembly that provides a stator with a minimum of cost and labor. Modular rotor and stator assemblies may then be combined to produce an efficient, low cost electric machine that may be controlled using a plurality of motor control techniques.

The invention further comprises a multiple phase, multiple drive control system and method that enables the modular motor described herein to operate at very high power efficiency and produce much greater torque than prior art electric machines. The control system described herein also offers increased torque throughout a motors' operational profile and increased electromagnetic power density due to multiple points of electromagnetic interaction between the rotor and stator.

Other features, objects, and advantages of the invention will become readily apparent from the detailed description of the preferred embodiments taken in conjunction with the attached drawing Figures.

DETAILED DESCRIPTION OF THE PREFERRED EMBODIMENT(S)

Figure 1:
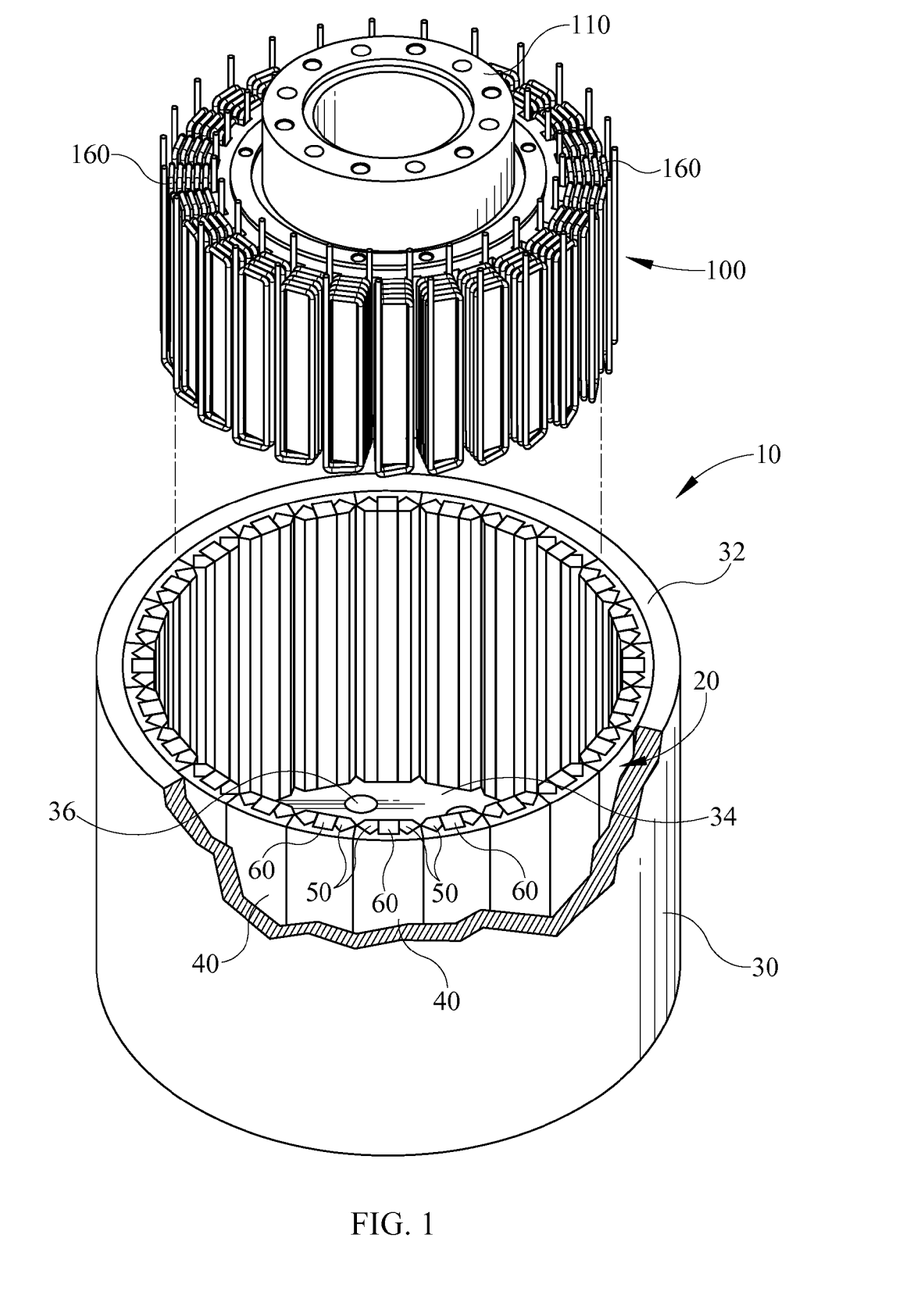
FIG. 1 is an exploded isometric view of a partially assembled electric motor in accordance with one embodiment of the present invention.
Figure 2:
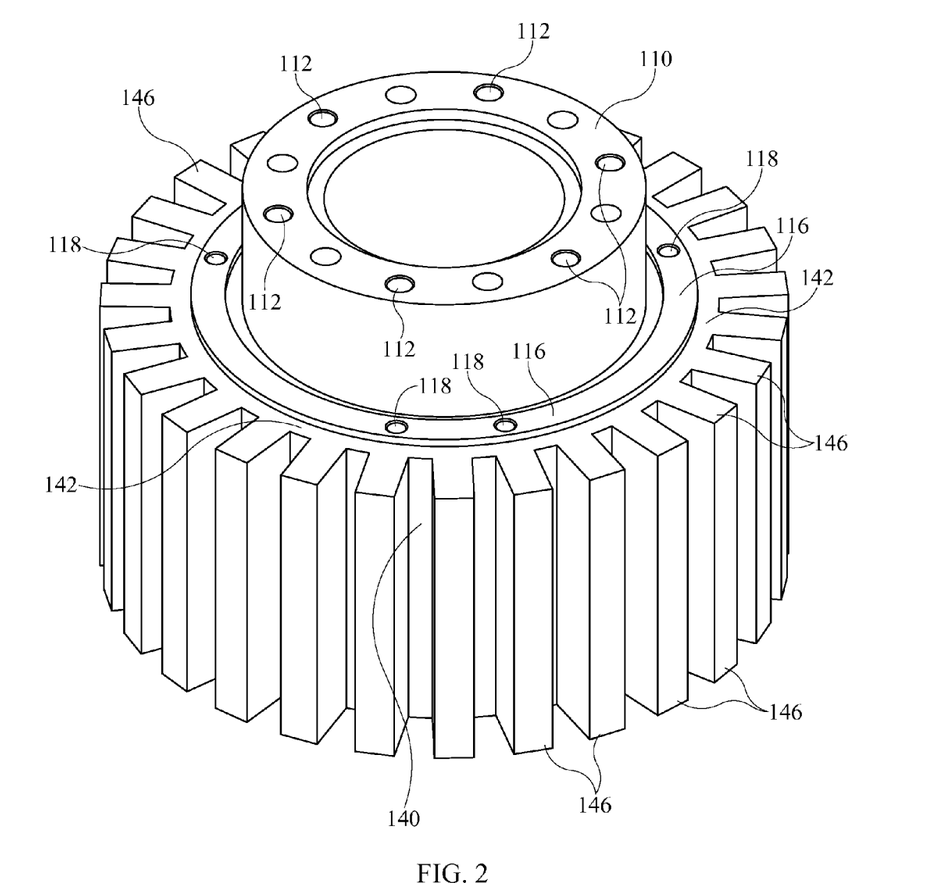
FIG. 2 is an isometric view of an unwound stator in accordance with one embodiment of the present invention.
Figure 3:
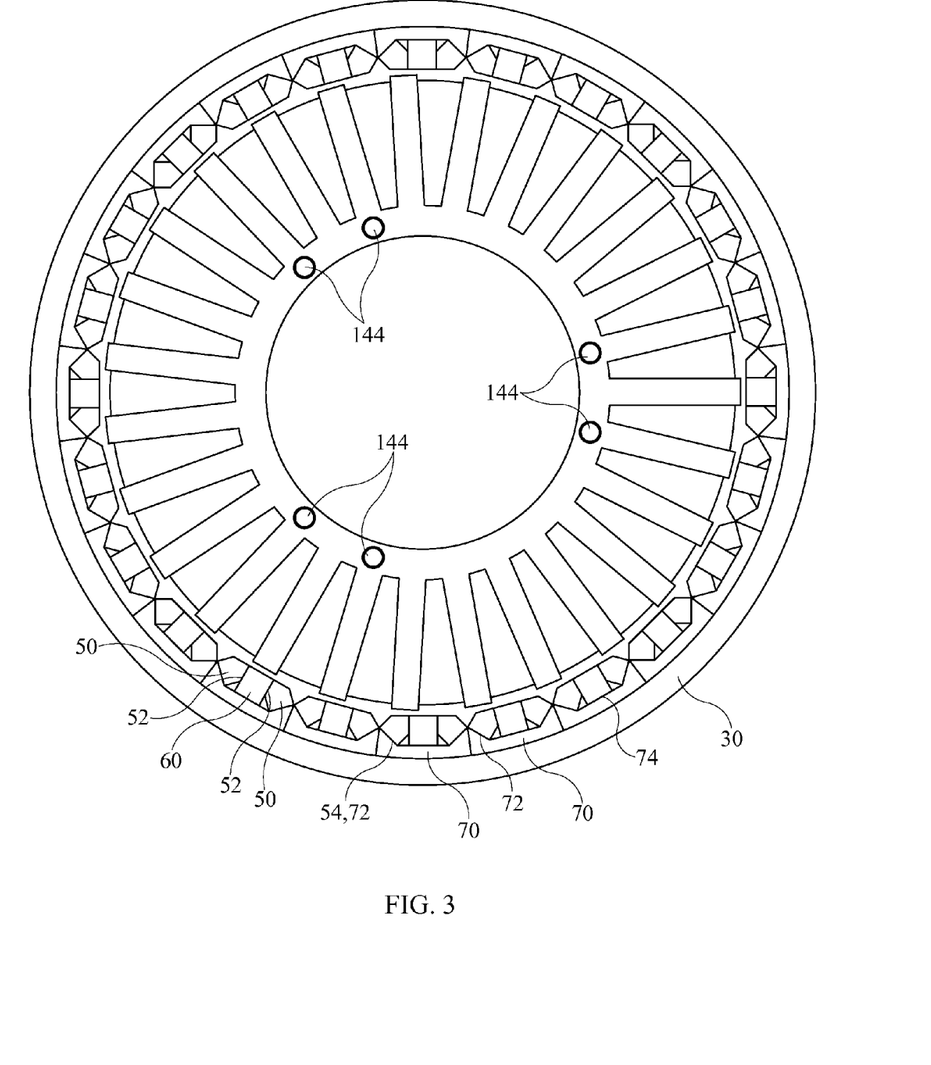
FIG. 3 is an elevation view of an assembled rotor and stator in accordance with one embodiment of the present invention.

Referring now to FIGS. 1-3 and in accordance with one embodiment of the present invention, a modular electric machine 10 comprises a modular rotor assembly 20 and a modular stator assembly 100. FIG. 1 depicts a partially assembled electric machine 10 wherein stator assembly 100 is disposed radially inwardly of an exterior rotor assembly 20. One of ordinary skill in the art will recognize that interior rotor/exterior stator-type electric machines are also considered to be within the scope of the present invention.

FIGS. 1 and 2 depict a modular rotor assembly 20 having an annular hub 30 that is generally open at a first end 32, and includes a closed end 34 having a plurality of apertures 36 therein for admitting cooling fluid into machine 10. Around an inside circumference of hub 30 are disposed a plurality of magnetic assemblies 40 of the type disclosed in co-pending U.S. patent application Ser. No. 12/842,686, filed Jul. 23, 2010, entitled "Modular Magnetic Circuit" and incorporated herein by reference.

Referring now to FIGS. 1-3 and in accordance with a constructed embodiment of the present invention, a magnetic circuit assembly 40 for a DC motor comprises a pair of bias magnets 50 and a pole magnet 60 disposed between bias magnets 50. Pole magnets 60 and bias magnets 50 may comprise any one of many known permanent magnetic materials such as rare earth magnets, composite magnets such as ceramic magnets, ferrite magnets, alnico magnets, and flexible magnets such as those composites produced with vinyl. Some exemplary types of permanent magnets that may be used in one embodiment of the invention are samarium cobalt magnets and neodymium-iron-boron (NIB) magnets. However, these magnetic materials are included in this specification only as examples of materials suitable for use with magnetic circuit assembly 40 and are not limiting of the scope of the invention. Furthermore, in an alternative embodiment of the present invention magnets 50, 60 may be injection molded to further decrease manufacturing costs while enabling the orientation of magnetic flux throughout the magnets as will be discussed further below.

As shown in exemplary embodiments in FIGS. 1 and 3 bias magnets 50 may be shaped as elongated trapezoids, having one face 52 abutting or contacting pole magnet 60, and another face 54 contacting a module body 70 surface 72. Module body 70 comprises a plurality of elongated slots, the sides of which form angled surfaces 72 that contact or engage bias magnets 50 along a portion thereof. While magnetic circuit assembly 40 depicted and described herein is referred to in this specification in the environment of a direct current motor rotor or stator, assembly 40 may be utilized in a plurality of alternative magnetic circuit applications without departing from the scope of the instant invention.

Magnetic assembly 40 may comprise a module body 70 having a bottom surface 72, and a shaped slot 74 therein for accepting a pair of bias magnets 50 and a pole element 60. Module body 70 is subsequently secured to annular rotor hub 30, along an inner circumference thereof as depicted in FIGS. 1 and 3. In this fashion a plurality of magnetic assemblies 40 may be constructed in advance and then simply secured to an electromagnetic device as required utilizing conventional fasteners and/or adhesives for ease of production and economy.

It should be noted that in embodiments of the present invention employing an exterior stator 100 and interior rotor 20 (not shown), magnetic assemblies 40 are disposed on an exterior circumference of said rotor, to periodically align with stator 100 teeth as stator rotates.

Referring again to FIGS. 1 and 2, stator assembly 100 comprises an annular central hub 110 having a plurality of cooling ports 112 disposed in an end 114 thereof that are capable of accepting a cooling fluid supplied by piping or tubing (not shown) carrying cooling water or air. Fluid ports 112 extend axially through hub 110 to deliver cooling fluid through the axial length of the entire hub, thereby maximizing heat transfer from hub 110 to the cooling fluid. This feature of the present invention provides advantageous cooling of stator hub 110, which tends to retain heat generated by electromagnetic energy generated by machine 10, which is particularly acute in high-power density motor applications in accordance with the present invention.

Stator hub 110 includes an outer circumferential portion 116 having a plurality of axially oriented threaded apertures 118 therein for securing a plurality of stator teeth 146 thereto. A stator body 140 extends radially outwardly from a central annular ring 142 that includes a plurality of axially oriented apertures 144 therein that align with apertures 118 on outer circumferential portion 116 of hub 110. Stator body 140 further comprises a plurality of stator teeth 146 extending radially outwardly from stator body 140, each tooth 146 having a generally rectangular cross-sectional profile, although one of ordinary skill in the art will recognize that a variety of stator teeth 146 shapes may be employed without departing from the scope of the instant invention. Furthermore, hub 110 may be comprised of lightweight aluminum or a composite material, or may be a conventional steel hub.

Stator body 140 may be formed of a plurality of relatively thin stamped ring 142 and tooth 146 laminations that are then stacked one upon the other and laminated together to produce stator body 140. Production of stator body 140 in this fashion reduces eddy currents induced into stator teeth 146 during machine operation, which in turn increases operational efficiency. In one embodiment of the present invention stamped ring 142 and tooth 146 laminations are comprised of neodymium, while in another embodiment the laminations may comprise a ceramic material. However, a wide variety of materials may be employed to produce stator body 140 without departing from the scope of the present invention. As shown in FIG. 1, stator teeth 146 are each wrapped with a conventional winding 160, comprised of a conductive winding material such as copper wire. Windings 160 are then supplied with, for examples, a source of alternating current (AC) voltage from a motor drive or other motor control system, thereby "energizing" windings 160 and setting up an electromagnetic field proximate the tooth 146 and winding 160. Windings 160 are omitted from drawing FIGS. 2-7 for simplicity.

Additionally, it should be noted that in embodiments of the present invention employing an exterior stator 100 and interior rotor 20, stator 100 teeth 146 are disposed extending radially inwardly from stator body 140 to periodically align with rotor 20 magnetic assemblies 40.

Referring now to FIGS. 4-7, there are depicted cross-sectional views of an electric machine 10, including rotor assembly 20 and stator assembly 100 wherein rotor pole magnets 60 periodically align radially with stator teeth 146 as rotor assembly 20 rotates by the known phenomenon of generating or setting up a rotating stator field caused by a periodically supplying current to windings 160. In this exemplary embodiment of the invention 10, wherein the electric machine is controlled as a synchronous AC motor, the current required to set up a rotating stator field is supplied by a motor drive, for example a vector drive, or a plurality of vector drives D1-D3 (not shown) that provide variable torque and speed control throughout the operation range of machine 10.

Figure 4:
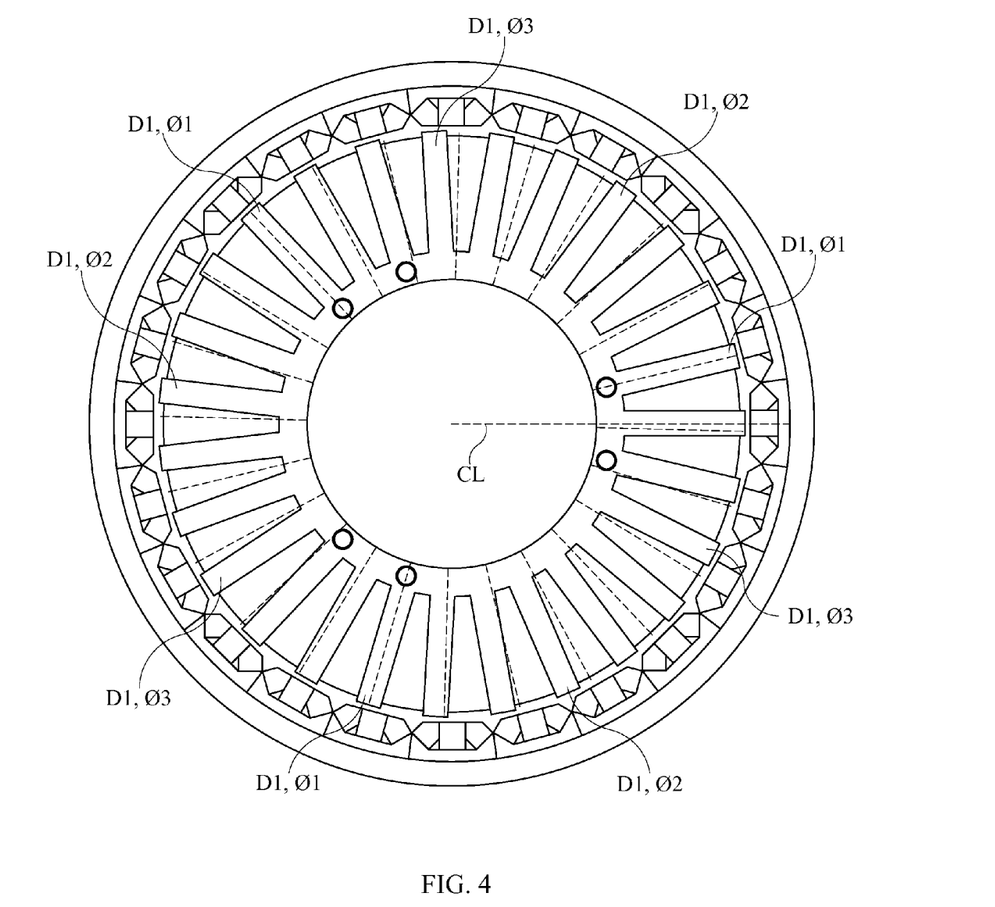
FIG. 4 is an elevation view of a rotor and stator depicting a plurality of energized stator teeth in accordance with one embodiment of the present invention.

Referring specifically to FIG. 4 an exemplary control system and method for electric machine 10 is described wherein a motor drive (not shown) provides a rotating stator field by providing alternating current (AC) to windings 160. A wide variety of motor control drives may be employed without departing from the scope of the present invention, including but not limited to vector drives and variable frequency drives. In the exemplary embodiment of the invention depicted herein in the drawing Figures it is contemplated that a plurality of vector drives may be employed to control electric machine 10.

Initially, a first rotating stator field corresponding to a first motor is set up by a first drive D1 in stator 100 assembly in accordance with three-phase AC motor control, wherein drive D1 initially provides AC current to a first set of windings 160 and stator teeth 146, that corresponds to a first phase φ1, which begins at the phase 1 centerline of motor 10, shown as dashed line φ1 centerline. (Phase 1 centerline is located one tooth counterclockwise from the d-axis of electric machine 10, shown as dashed line CL in FIGS. 4-7). The initial drive D1, phase 1, and starting stator tooth 146 are shown in FIG. 1 as reference numeral D1 φ1, which is indicative of drive 1, phase 1. In drawing FIGS. 4-7 windings 160 aren't explicitly shown to simplify the drawing view. Since exemplary motor 10 shown in FIG. 4 includes a total of twenty-seven (27) stator 100 teeth 146, each successive winding 160 to be energized for drive 1 is located 120 degrees around the rotor from the initial phase 1 tooth location. Accordingly, traversing 120 degrees counter-clockwise from D1 φ1, there is located again D1 φ1. Similarly, D1 φ1 is located 120 degrees clockwise from that point as shown in FIG. 4.

Similarly, the drive 1 second phase (D1 φ2) winding 160 order can be located by beginning forty degrees (3 teeth) counterclockwise from phase 1 initial winding D1 φ1. Phase two initial winding order is shown as D1 φ2, each located 120 degrees apart from each other around stator 100. In an identical fashion the third phase winding order is shown by D1 φ3 located sequentially 120 apart around stator 100. Thusly FIG. 4 depicts an exemplary winding 160 order for a first three-phase AC synchronous motor 10. A rotating stator field may then be set up in stator 100 by operation of drive D1 in accordance with known motor control techniques. Based on the foregoing, the stator teeth 146 and windings 160 energized by drive D1 cooperate to act as a first motor within electric machine 10.

Figure 5:
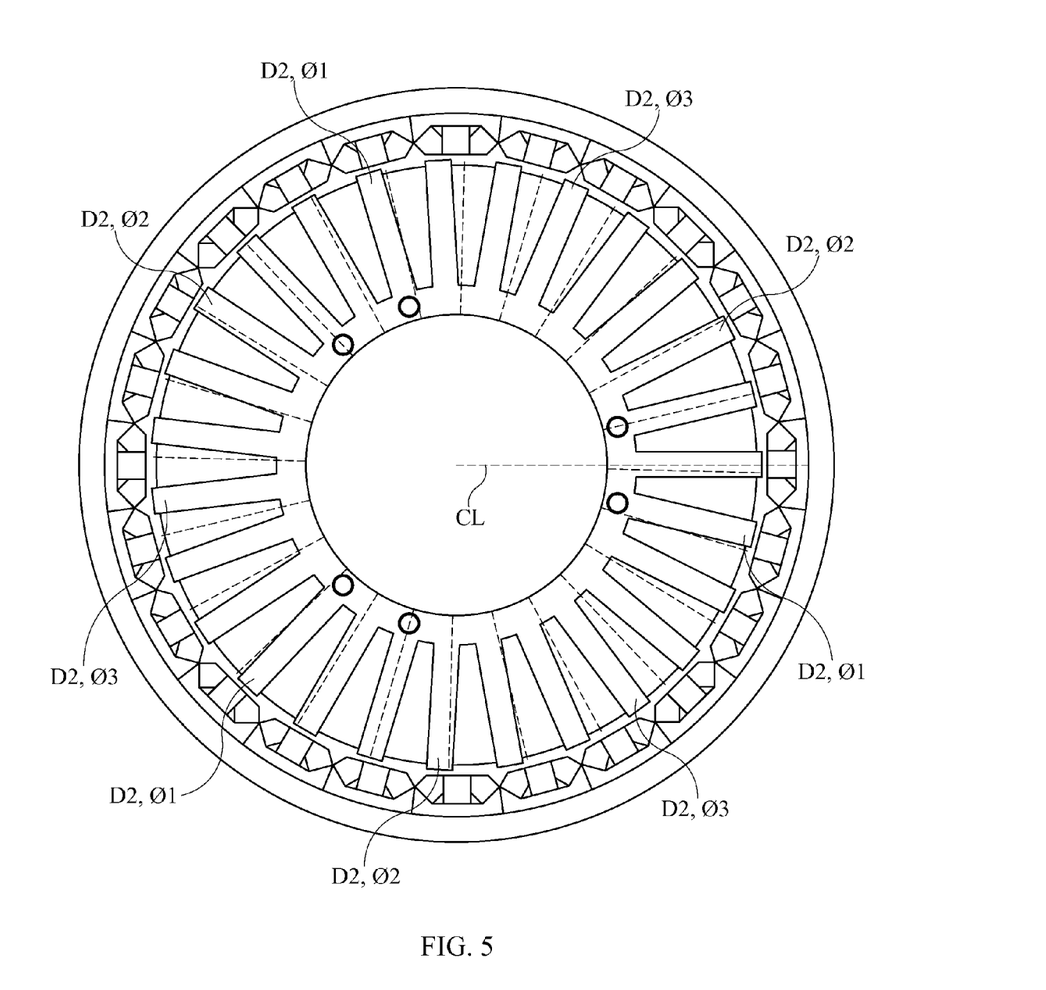
FIG. 5 is an elevation view of a rotor and stator depicting a plurality of energized stator teeth in accordance with one embodiment of the present invention.

Referring now to FIG. 5 and also in accordance with a constructed embodiment of the present invention, a second drive D2 (also not shown) is configured for a second set of stator 100 windings 160 independently of, but in concert with first drive D1. Accordingly, the invention contemplates a single stator 100 and rotor 20 operating and being controlled electrically as multiple intermeshed, but independent motors. Beginning at approximately 90 degrees counterclockwise from phase 1 centerline, drive 2, phase 1's initial winding 160 is located at D2 φ1. In an identical pattern to drive 1, windings 160 for D2 φ1 are located 120 degrees apart. In a similarly fashion, drive 2 phase 2 windings 160 are denoted at, D2 φ2 and drive 2 phase 3 windings are denoted at D2 φ3. Note the pattern of windings 160 for drive 2 is identical to that of drive 1, but begins at a different winding 160 and tooth 146 on stator 100. Additionally, windings 160 energized by drive 2 are exclusive of windings 160 that are controlled by drive 1. Accordingly, drive D2 thus sets up a second rotating stator 100 electromagnetic field by energizing stator windings 160 associated with drive D2 in a manner known in the motor control arts, thereby providing a second stator field (and thus motor 10) operating within the same stator 100 and rotor 20 as that depicted in FIG. 4, yet completely independent thereof.

Figure 6:
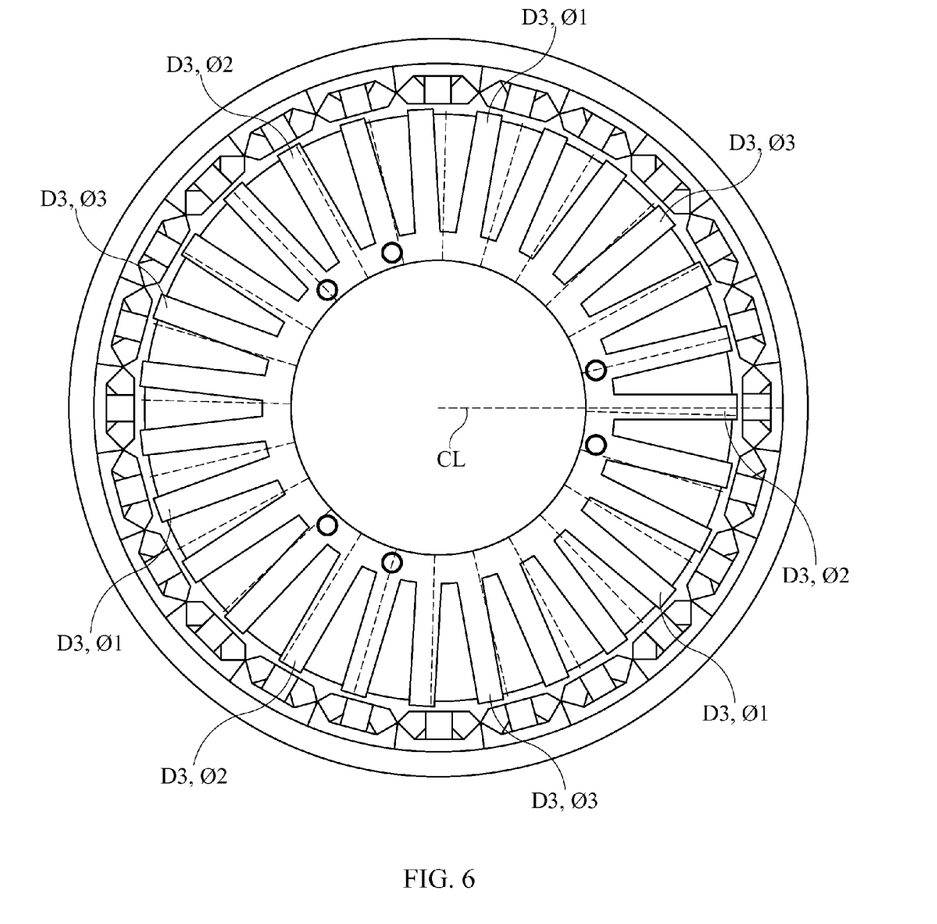
FIG. 6 is an elevation view of a rotor and stator depicting a plurality of energized stator teeth in accordance with one embodiment of the present invention.

In a corresponding fashion, FIG. 6 depicts the pattern of windings 160 of a third exemplary drive D3 which is also offset 90 degrees counterclockwise from drives D1 and D2. In an identical pattern to drives 1 and 2, the drive 3 D3 phase 1, 2 and 3 windings are denoted by D3 φ1, D3 φ2, and D3 φ3 respectively. Once again the pattern of windings 160 for drive 3 is also identical to that of drives 1 and 2, but begins at a different tooth 146 on stator 100, and once again the windings 160 energized by drive D3 are exclusive of the windings 160 controller by drives D1 and D2. Once again drive D3 sets up a third independent rotating stator 100 field operating within motor 10. Thus FIG. 6 depicts the operation of a third rotating electromagnetic field (and thus motor 10) utilizing the same rotor 20 and stator 100 as drives D1 and D2.

Figure 7:
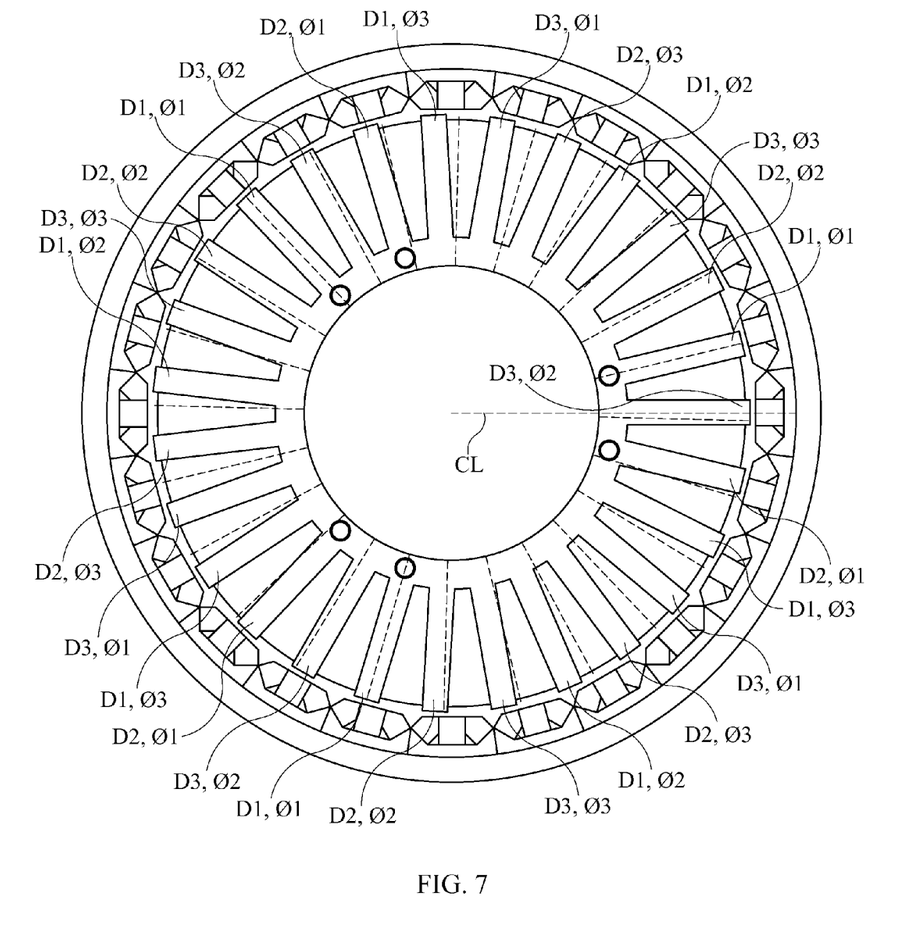
FIG. 7 is an elevation view of a rotor and stator depicting a plurality of energized stator teeth in accordance with one embodiment of the present invention.

FIG. 7 depicts the combination of motor 10 drives D1, D2 and D3 around stator 100 when each of the three aforementioned drives are combined, each drive and phase being depicted on the same diagram. In operation, drives 1, 2 and 3 set up three different and independent rotating stator fields, to energize the windings 160 in a balanced fashion around stator 100, simultaneously. This method of control provides for a motor 10 having very high power density that utilizes a much larger percentage of the electrical power supplied to motor 10 than prior art motor 10 designs because three motors are controlled utilizing three separate and distinct motor control systems integrated into a single physical motor.

In operation, drives D1-D3 each set up a rotating stator field upon startup of motor 10. The three rotating stator fields set up in machine 10 act to energize three adjacent teeth 146 thereby providing tremendous power density within machine 10. In comparison to prior art motor control systems, the present system is capable of providing three times the current (and thus power) to motor 10 since three separate drives are utilized to control motor 10. This system and method of motor control provides maximum power and torque output for a given power input, which is particularly useful when motor 10 is utilized in an automotive or transportation application requiring the acceleration of a load to a specific operating speed. Stated another way, a motor 10 constructed and controlled in accordance with the present invention is capable of accepting more input power than conventional and similarly sized motors, and therefore capable of supply more mechanical power to a load than prior art motors.

Furthermore, once the synchronous speed of motor 10 is achieved, or when a predetermined desired speed is achieved, one or two drives may be turned off, so that only two or one drives supply current to motor 10. While this mode of operation reduces torque and power output of motor 10 proportionally to the current reduction caused by the omission of a drive or drives, motor 10 can be still be operated at a reduced torque output, and thus at a reduced energy consumption level. This feature of the present invention is particularly useful in transportation applications, where a motor may be required to accelerate a vehicle up to a cruising speed, requiring a high torque output from motor 10, and may thereafter not require a large amount of torque to maintain the vehicles' speed. Additional drives may be turned on as required for higher torque output from motor 10.

Additionally, the present invention provides a further advantage in the situation where a single drive fails while utilizing the control system for an electric machine 10 described above. Motor 10 can be run with almost no loss of power by simply increasing the current supplied by the two remaining drives. For example, where each drive D1, D2 and D3 is supplying 50 amps of current to stator 100 and drive D1 fails, drives D2 and D3 can be adjusted to supply 75 amps each, thereby still providing 150 total amps to motor 10. In this embodiment of the invention the loss of power and torque to motor 10 operating with higher current supplied by two drives D2 and D3 is almost negligible. This redundancy is a great advantage over prior art motors.

In one embodiment of the present invention, motor 10 can be provided with a stator 100 having a greater or smaller number of teeth 146 without departing from the scope of the invention. Furthermore, rotor 20 can be produced having a greater or smaller number of magnetic assemblies 40. This feature of the invention permits a great number of possible points of electromagnetic attraction between rotor 20 and stator 100 and furthermore, permits machine 10 to be controlled by a plurality of drives D1 ... DN. For example, while the exemplary embodiments set forth in FIGS. 4-7 discussed a three-drive motor control configuration, the present invention may incorporate a plurality of motor drives DN for controlling a plurality of rotating stator fields within motor 10 without departing from the scope of the invention. Prior art motors are incapable of handling the enhanced flux density that may be maintained in motor 10.

Furthermore, since the construction of the invention provides the ability to utilize multiple drives D1-D3, and thus provide a much greater power input to motor 10 than prior art motors, a considerably greater magnetic flux density may be achieved in motor 10, thereby providing a greater power output than prior art machine 10 designs. The force provided by motor 10 controlled in accordance with the system of the invention when rotor 20 is in a position of attraction—meaning that a rotor 20 pole 60 is approaching a stator tooth 146 is greatly increased. This feature of the invention provides a motor 10 having an enhanced torque output over prior art devices. Accordingly, motors made utilizing the unique stator 100 and rotor 20 configuration and control scheme described herein may be constructed smaller, using fewer costly materials while not sacrificing torque. A reduced size rotor will have the further advantage of having a lower rotating mass, thereby further enhancing performance.

The increase in force provided by a motor 10 controlled in accordance with the present invention while the rotor 20 and stator 100 are in a position of opposition causes more electromagnetic force provided by the stator fields set up by drives D1-D3 to be converted to rotational force in the motor, or torque. Similar advantages are to be found when utilizing the present invention in the context of a generator since the higher flux density created in the generator converts more of the mechanical energy of the spinning rotor 20 into electrical energy.

Figure 8:
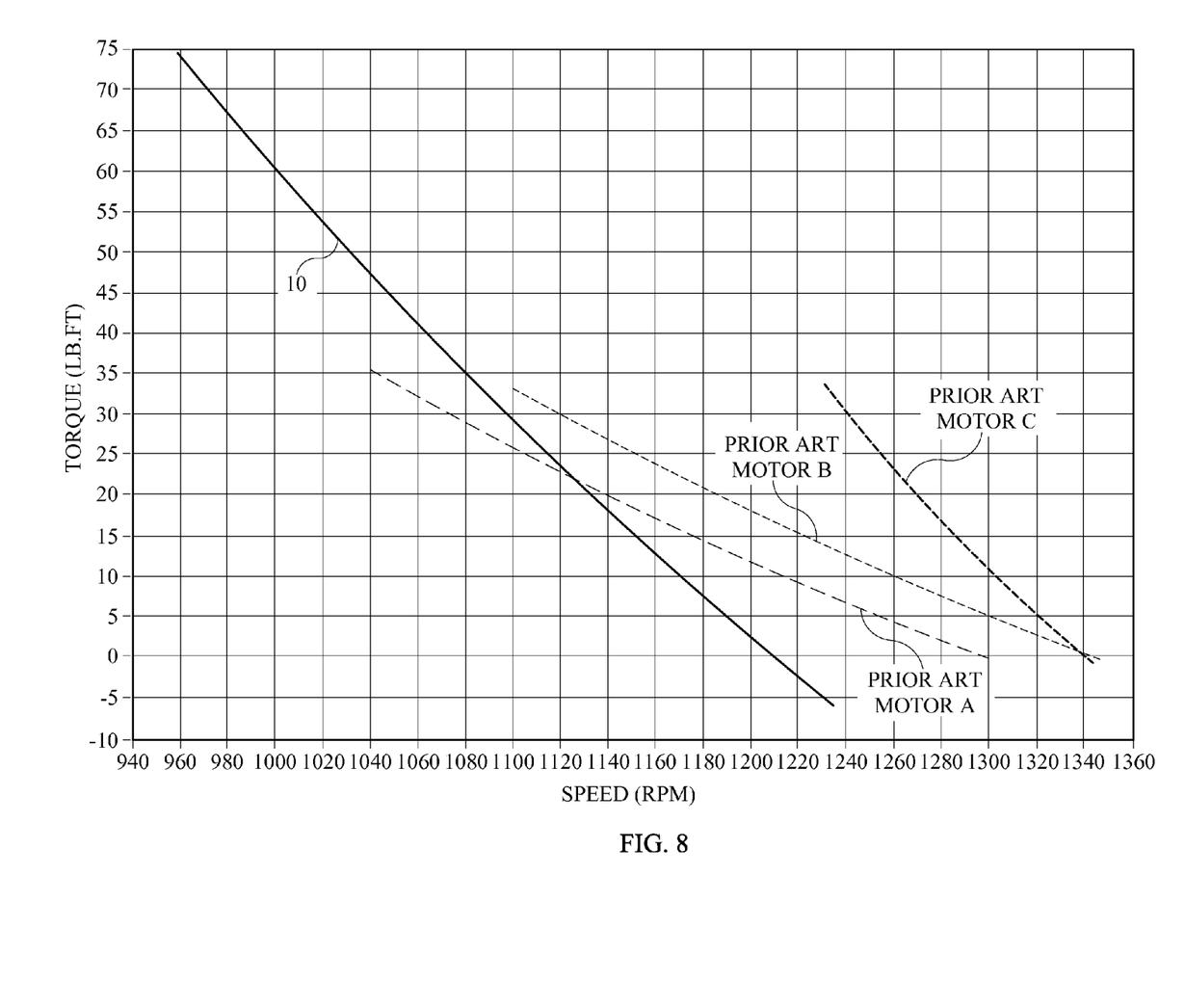
FIG. 8 is a graph of torque versus motor speed for a plurality of prior art motors and for an electric motor in accordance with one embodiment of the present invention.

FIG. 8 depicts an exemplary speed vs. torque curve for motor 10 produced and controlled in accordance with the present invention as well as corresponding curves for three comparable prior art motors, A, B, and C respectively. Prior art motors A, B and C are 13" diameter motors, while motor 10 is an 8" motor. Each motor represented in FIG. 8 was supplied with 57 amperes of alternating current (rms) through each drive utilized. Motor 10 is controlled with three drives, each supplying 57 A rms in this depiction, although a greater or lesser number of drives may be utilized without departing from the scope of the invention. As can be seen from this Fig., the electric machine 10 produced and controlled in accordance with the invention provides a much greater amount of torque at a much lower rotational speed. In fact, prior art motors A, B and C do not have any torque response below approximately 1040 rpm, while motor 10 provides high torque response at 960 rpm.

Figure 9:
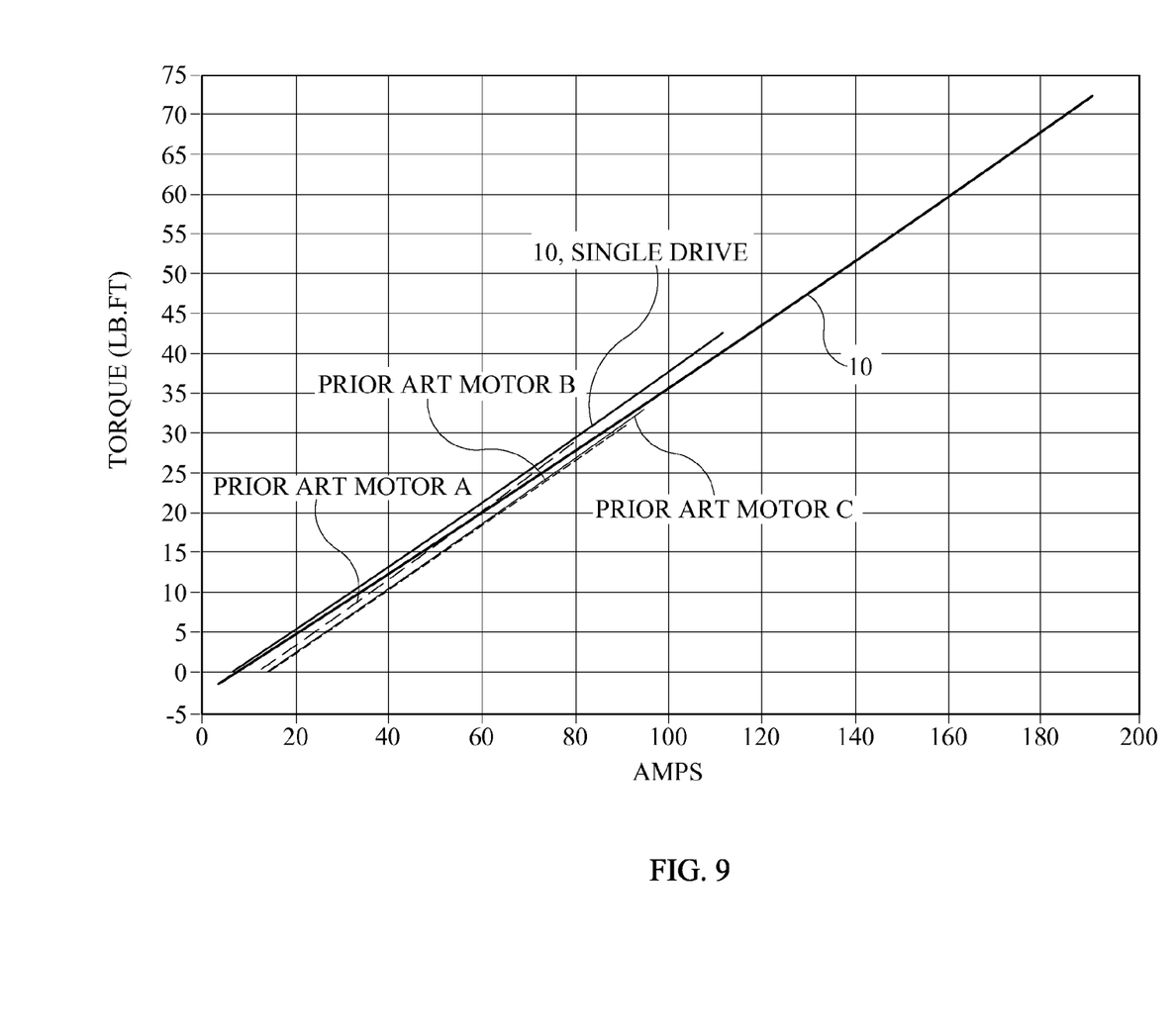
FIG. 9 is a graph of torque versus current for a plurality of prior art motors and for an electric motor in accordance with one embodiment of the present invention.

FIG. 9 depicts an exemplary speed vs. current (in amperes, rms) for motor 10 in comparison with prior art motors A, B, and C, as well as motor 10 controlled by a single drive, rather than 3 drives. In each curve, each motor is supplied with 57 A rms current from each drive. Referring the curve representing motor 10 controlled by a single drive, it can be seen that motor 10's torque vs. current performance is slightly improved over the larger package prior art motors, even when controlled by a single drive.

The curve labeled 10 of FIG. 9 depicts a motor controlled by 3 drives, each supplying 57 A rms current. The torque curve for this motor continues upward to 70+ lb-ft, long after prior art motors A, B and C have reached their maximum torque. This is due to the fact that motor 10 is capable of handling much more current and thus much more magnetic flux density and power than prior art motors A, B and C. This obvious advantage of the instant invention is a marked improvement over the prior art because it allows much greater power input and power output from a motor of reduced size and weight.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A modular electric machine comprising:
    an annular rotor having a plurality of modular spaced magnetic assemblies disposed around an inner circumference thereof, each of said magnetic assemblies including a pole element and at least one bias magnet proximate said pole element; and
    a stator comprising a central hub and a plurality of modular stator teeth extending radially outwardly, said teeth disposed radially inwardly of said spaced magnetic assemblies, said stator positioned within said rotor such that said pole elements and said stator teeth periodically align as said rotor rotates.

2. A modular electric machine as claimed in claim 1 wherein said magnetic assemblies comprise:
    a pair of opposed bias magnets, each of said bias magnets including one elongated surface; and
    a pole element having two surfaces proximate each of said one elongated surface of said bias magnets, whereby magnetic flux is directed through the pole element surfaces.

3. A modular electric machine as claimed in claim 1 wherein said rotor comprises:
    an interior circumference having a plurality of elongated axially oriented slots therein, each of said slots shaped to accept said pole magnet and said at least one bias magnet.

4. A modular electric machine comprising:
a modular stator having a plurality of radially extending laminated conductive teeth each provided with an electrically conductive winding to form a plurality of electromagnets; and
a modular rotor having a plurality of magnetic assemblies spaced along an inner circumferential surface thereof, each of said magnetic assemblies including a pole element and at least one bias magnet proximate said pole element wherein said stator is disposed within said rotor for electromagnetically interacting with said stator teeth.

5. A modular electric machine as claimed in claim 4 wherein said magnetic elements comprise:
a pair of opposed bias magnets; and
a pole magnet disposed between said bias magnets for directing magnetic flux through said bias magnets and said pole magnet toward said stator teeth.

6. A modular electric machine as claimed in claim 4 wherein said magnetic elements comprise:
a pair of opposed bias magnets, each of said bias magnets including one elongated surface; and
a pole element having two surfaces proximate each of said one elongated surface of said bias magnets, whereby magnetic flux is directed through the pole element surfaces.

7. A modular electric machine comprising:
an annular rotor having a plurality of modular spaced magnetic assemblies disposed around an outer circumference thereof, each of said magnetic assemblies including a pole element and at least one bias magnet proximate said pole element; and
a stator comprising a central hub and a plurality of modular stator teeth extending radially inwardly, said teeth disposed radially outwardly of said spaced magnetic assemblies of said rotor, said rotor positioned within said stator such that said pole elements and said stator teeth periodically align as said rotor rotates.

8. A control system for a modular electric machine having a rotor with a plurality of spaced modular magnetic assemblies each including a pole element and at least one bias magnet proximate said pole element disposed around an outer circumference thereof and a stator having a plurality of windings around a plurality of stator teeth, said rotor positioned within said stator such that said pole elements and said stator teeth periodically align as said rotor rotates comprising:
a plurality of motor drives for providing electrical current sequentially to a specified sequence of said plurality of modular windings for producing an electromagnetic field, whereby each of said plurality of drives produces an independent rotating electromagnetic field in said stator thereby driving said rotor.

9. A control system for a modular electric machine as claimed in claim 8 comprising:
a speed sensor for monitoring the rotational speed of said rotor, whereby at least one motor drive producing a rotating electromagnetic field in said stator can be turned on or off responsive to said speed sensor.

10. A control system for a modular electric machine as claimed in claim 8 comprising:
a torque sensor for monitoring the torque of said rotor, whereby at least one motor drive producing a rotating electromagnetic field in said stator can be turned on or off responsive to said torque sensor.

11. A control system for a modular electric machine as claimed in claim 8 comprising:
three motor drives for providing electrical current sequentially to a specified sequence of said plurality of windings for producing an electromagnetic field, whereby each of said drives provides current sequentially to adjacent stator windings.

12. A control system for a modular electric machine as claimed in claim 8 comprising:
two motor drives for providing electrical current sequentially to a specified sequence of said plurality of windings for producing an electromagnetic field, whereby each of said drives provides current sequentially to adjacent stator windings.

13. A method of controlling a modular electric machine having a rotor with a plurality of modular spaced magnetic assemblies each including a pole element and at least one bias magnet proximate said pole element disposed around an outer circumference thereof and a stator having a plurality of windings around a plurality of stator teeth, said rotor positioned within said stator such that said pole elements and said stator teeth periodically align as said rotor rotates comprising the steps of:
providing a plurality of motor drives for providing electrical current sequentially to a specified sequence of said plurality of modular windings for producing an electromagnetic field; and
generating an independent rotating electromagnetic field with each of said plurality of motor drives in said stator thereby driving said rotor.

14. A method of controlling a modular electric machine as claimed in claim 13 comprising the steps of:
monitoring the rotational speed of said rotor; and
removing at least one independent rotating electromagnetic field in said stator by turning off at least one of said motor drives at a predetermined rotational speed of said rotor.

15. A method of controlling a modular electric machine as claimed in claim 14 comprising the steps of:
monitoring the rotational speed of said rotor; and
adding at least one independent rotating electromagnetic field in said stator by turning on at least one of said motor drives at a predetermined rotational speed of said rotor.

16. A method of controlling a modular electric machine as claimed in claim 13 comprising the steps of:
monitoring the torque output of said rotor:
removing at least one independent rotating electromagnetic field in said stator by turning off at least one of said motor drives at a predetermined torque output of said rotor.

17. A method of controlling a modular electric machine as claimed in claim 16 comprising the steps of:
monitoring the torque output of said rotor:
adding at least one independent rotating electromagnetic field in said stator by turning on at least one of said motor drives at a predetermined torque output of said rotor.

* * * * *